United States Patent
Ballard (10) Patent No.: US 7,585,080 B2
(45) Date of Patent: Sep. 8, 2009

(54) SPRING-BIASED MULTI-AXIS ARTICULATING LENS COVER

(76) Inventor: Marlin Daniel Ballard, 4900 W. William Cannon, Austin, TX (US) 78749

(*) Notice: Subject to any disclaimer, the term of this patent is extended or adjusted under 35 U.S.C. 154(b) by 77 days.

(21) Appl. No.: 11/985,458

(22) Filed: Nov. 15, 2007

(65) Prior Publication Data

US 2008/0186584 A1    Aug. 7, 2008

Related U.S. Application Data

(60) Provisional application No. 60/898,806, filed on Feb. 1, 2007, provisional application No. 60/928,066, filed on May 8, 2007, provisional application No. 60/961,674, filed on Jul. 24, 2007.

(51) Int. Cl.
  *G02B 23/16*  (2006.01)
  *F41G 1/38*  (2006.01)
(52) U.S. Cl. .................... 359/511; 42/129
(58) Field of Classification Search ............. 359/511; 42/129; 396/448
  See application file for complete search history.

(56) References Cited

U.S. PATENT DOCUMENTS

| | | | |
|---|---|---|---|
| 2,488,188 A * | 11/1949 | Halvorson | 42/129 |
| 2,632,252 A | 3/1953 | Blais | |
| 2,889,629 A * | 6/1959 | Darkenwald | 42/129 |
| 3,831,285 A * | 8/1974 | Vissing | 42/129 |
| 4,909,617 A | 3/1990 | Boyd | |
| 5,495,676 A * | 3/1996 | Chesnut et al. | 42/129 |
| 6,033,130 A * | 3/2000 | Muroi et al. | 396/448 |
| 6,132,110 A * | 10/2000 | Kume et al. | 396/349 |
| 6,247,855 B1 * | 6/2001 | Motohashi et al. | 396/448 |
| 6,799,854 B1 | 10/2004 | Steiner | |
| 6,811,268 B2 * | 11/2004 | Watson | 359/611 |
| 7,128,436 B2 * | 10/2006 | Bensinger et al. | 362/186 |
| 2005/0168976 A1 * | 8/2005 | Chen | 362/186 |
| 2006/0218841 A1 * | 10/2006 | Campean | 42/129 |

* cited by examiner

*Primary Examiner*—Alessandro Amari
*Assistant Examiner*—Mark Consilvio
(74) *Attorney, Agent, or Firm*—David O. Simmons

(57) ABSTRACT

A lens cover apparatus comprises a mounting structure, a lens cover, a pivot joint structure, and a spring. The mounting structure is configured for securing the lens cover apparatus to a support structure. The pivot joint structure is coupled between the mounting structure and the lens cover and configured for allowing multi-axis articulation of the lens cover with respect to the mounting structure. The spring is coupled between the pivot joint structure and the lens cover. The spring and the pivot joint structure are jointly configured for causing spring-biased multi-axis articulation of the lens cover between a use position thereof and a stowed position thereof in response to manual initiation of the articulation.

29 Claims, 7 Drawing Sheets

SPRING-BIASED MULTI-AXIS ARTICULATING LENS COVER

CROSS REFERENCE TO RELATED APPLICATIONS

This patent application claims priority to co-pending U.S. Provisional Patent Application having Ser. No. 60/898,806, filed Feb. 1, 2007, entitled "Lens Cover Device For Firearm Sighting Devices and the Like", having a common applicant herewith and being incorporated herein in its entirety by reference.

This patent application also claims priority to co-pending U.S. Provisional Patent Application having Ser. No. 60/928,066, filed May 8, 2007, entitled "Lens Cover Device For Firearm Sighting Devices and the Like", having a common applicant herewith and being incorporated herein in its entirety by reference.

This patent application still further claims priority to co-pending U.S. Provisional Patent Application having Ser. No. 60/961,674, filed Jul. 24, 2007, entitled "Lens Cover Device For Firearm Sighting Devices and the Like", having a common applicant herewith and being incorporated herein in its entirety by reference.

FIELD OF THE DISCLOSURE

The disclosures made herein relate generally to lens cover apparatuses and apparatuses and, more particularly, to lens cover apparatuses that are selectively movable between various positions such as, for example, a closed position, an open position and/or, a stowed position.

BACKGROUND

Known protective lens covers configured for use on various types of sighting devices generally fall into one of three general types. A first one of these types corresponds to an unattached or tethered lens cover, which is pressed into place (e.g., similar to placing a plastic lid on a plastic food container). A second one of these types corresponds to a hinged flip-open cover, which can be spring-loaded so as to have the torsion spring finish opening the lens cover once the user's finger disengages the lens cover from the retaining ring or latch, which was holding it closed. A flip-open style protective cover can have a single pivot axis that extends generally perpendicular or parallel to a centerline reference axis (e.g., a centerline of a firearm bore). A flip-open style protective cover can also have a dual pivot axis arrangement that allows rotation and/or pivoting of the protective lens cover. A third one of these types corresponds to a rubber "bikini" style or double bungee cord style in which the lens cover is held in place by the tension of the elastic cords compressing the lens cover onto the sighting device. Examples of such sighting devices include, but are not limited to, optical, targeting, or sighting devices such as night vision scopes, flash lights, tactical lights, filter mounts for optical sights, holographic sighting devices, laser firearm sights, laser pointers, unmagnified optical sighting devices, monocular rifle scopes, magnifying adapters for unmagnified firearm scopes, binoculars, radar or laser speed measuring devices, camera lenses, telescopes, spotting scopes, land surveying devices, optical or laser distance measuring devices, and any other device which has a lens, opening, or viewing window in need of a protective lens cover. It should be understood that a lens cover is sometimes also be referred to as a lens cap.

With respect to one specific application for protective lens covers, a need has developed in recent years for placing two sighting devices (e.g., sighting scopes) on a firearm (e.g., a rifle) in very close proximity to each other. Unattached covers are inconvenient because they need to be stowed when the device is being used, and they are easily misplaced. Unattached covers may also be unsafe as a result of diverting the user's attention when the lens cover is dropped or when the user is stowing the lens cover. Tethered lens covers are unsafe because the line attached to the lens cover may become snagged. A tethered cover may also create an unsafe situation when the loose cover is flopping around and inadvertently obscures the user's vision. Bikini style or bungee style covers suffer from the problem of having the lens covers flopping around loose once they are removed from the scope such that they can then get snagged, get in the user's way, create a distraction, or require some type of manual stowage to get them out of the way. Rubber bikini style covers often require some arranging in order to get them seated into the correct cover position, and they sometimes actively or passively scratch or smudge the lenses they are intended to protect. Flip-open style covers having a single pivot axis that extends generally perpendicular to the centerline axis of a firearm bore generally cannot be used, as their pivot actions require the adjacent sighting devices to be undesirably spaced apart. In the case of flip-open style covers having a single pivot axis that extends generally parallel to the centerline axis of a firearm bore, when the lens cover is moved to an open position (i.e., position allowing viewing through the sighting device(s), the lens cover sticks out in the way of the user's vision along the side of the sighting device or sticks out in a manner where it is easily snagged and/or damaged. In other words, with currently configured hinged (i.e., pivotable) lens covers, if the user is viewing through the sighting device (with the lens cover open), and then moves their eye to the side of the axis of view through the device (so as to be able to look past the sighting device rather than through it), a currently configured lens cover can often obstruct their view.

In U.S. Pat. No. 6,799,854, Steiner discloses a protective lens cover for a pair of binoculars or a telescope. The protective lens cover is articulated to the front of the lens and is characterized in that a pivot joint arrangement is formed between an edge of the lens and the protective lens cover, in use having a substantially horizontal pivot axis and a substantially vertical pivot axis. However, the protective lens cover of Steiner does not provide for self-articulation and is not spring-biased. As such, and in view of the specific configuration of the protective cap of Steiner, at least three separate manual manipulations are required for moving the protective lens cover between a closed position and an open/stowed position are required and at least three separate manual manipulations are required for moving the protective lens cover between the closed position and the open/stowed position. For any number of reasons, these required manual manipulations are shortcomings that make the protective lens cover of Steiner undesirable in many applications (e.g., law enforcement, military, and the like).

Another limitation of Steiner relates to two sighting devices that are mounted in close end-to-end proximity. Steiner discloses that opening his lens cover entails pivoting the lens cover 180-degrees about a hinge pivot axis from a lens covering position to a first displace position, then rotating the lens cover 180-degrees about an axial rotation axis, and then pivoting the lens cover an additional 90-degrees about the hinge pivot axis to its fully stowed position. This stated manipulation of the lens cover precludes use of a lens cover in accordance with Steiner in a position between two sighting devices that are mounted in close end-to-end proximity.

Therefore, a lens cover apparatus that overcomes drawbacks associated with prior art lens cover apparatuses would be advantageous, desirable and useful.

SUMMARY OF THE DISCLOSURE

Embodiments of the present invention relate to lens covers apparatuses for either the leading end or trailing end of targeting scopes and other aiming devices or accessories for firearms, and for other viewing, pointing, and lighting devices in general, whether or not they are used on a firearm. Furthermore, embodiments of the present invention overcomes drawbacks associated with prior art lens cover apparatuses. More specifically, embodiments of the present invention provide for lens cover apparatuses that are spring biased with respect to respective use and stowed positions thereof and that exhibit multi-axis articulation when moved between the respective use and stowed positions thereof. In one embodiment, multi-axis articulation includes the lens cover pivoting about two separate and defined axes, which can be substantially perpendicular to each other or otherwise - skewed. In this manner, with respect to prior art lens cover apparatuses, a lens cover apparatus in accordance with an embodiment of the present invention allows for fast and non-cumbersome movement between use and stowed positions, minimizes manual operations required for movement between the use and stowed positions, and provides for a stowed position of the lens cover that renders it non-obtrusive and less prone to damage. Examples of lens covers of lens cover apparatuses in accordance with embodiments of the present invention include, but are not limited to, a lens cover that protects a lens from damage, a lens cover configured for filtering light transmitted through a lens (i.e., filtering light transmitted therethrough), a lens cover configured for preventing light from reflecting from a lens and causing a visible 'flash' of light (i.e., limiting an angle of transmission of light transmitted therethrough), and the like.

In one embodiment of the present invention, a lens cover apparatus comprises a mounting structure, a lens cover, a pivot joint structure, and a spring. The mounting structure is configured for securing the lens cover apparatus to a support structure. The pivot joint structure is coupled between the mounting structure and the lens cover and configured for allowing multi-axis articulation of the protective lens cover with respect to the mounting structure. The spring is coupled between the pivot joint structure and the lens cover. The spring and the pivot joint structure are jointly configured for causing spring-biased multi-axis articulation of the lens cover between a use position thereof (i.e., position in which the lens cover is in use over the lens aperture) and a stowed position thereof (i.e., a defined position fully displaced from the use position) in response to manual initiation of the articulation.

In another embodiment of the present invention, a protective lens cover apparatus configured for use with a sighting device comprises a mounting structure, a protective lens cover, a pivot joint structure, and a spring. The mounting structure is configured for being fixedly and releaseably attached to a body of a sighting device and/or a support structure on which the sighting device is mountable. The protective lens cover is configured for covering at least a portion of a lens aperture extending through an external surface of the body of the sighting device when the protective lens cover is in a use position thereof with respect to the mounting structure. The pivot joint structure is coupled between the mounting structure and the protective lens cover and configured for allowing multi-axis articulation of the protective lens cover with respect to the mounting structure. The spring is coupled between the pivot joint structure and the protective lens cover. The spring and the pivot joint structure are jointly configured for causing spring-biased multi-axis articulation of the protective lens cover between the use position thereof and a stowed position thereof in response to manual initiation of the articulation.

In another embodiment of the present invention, a sighting device assembly comprises a sighting device and a protective lens cover apparatus. The sighting device includes a body having a lens aperture extending through an external surface thereof. The protective lens cover apparatus includes a mounting structure, a protective lens cover, a pivot joint structure coupled between the mounting structure and the protective lens cover, and a spring coupled between the pivot joint structure and the protective lens cover. The mounting structure is attached to the body and/or a support structure on which the sighting device is mounted. The pivot joint structure allows multi-axis articulation of the protective lens cover with respect to the mounting structure. The pivot joint structure further allows for manual positioning of the protective lens cover in front of the lens aperture such that the spring biases the lens cover into a use position against the body in front of the lens aperture. The pivot joint structure and the spring are jointly configured for causing spring-biased multi-axis articulation of the protective lens cover to a stowed position when the lens cover is manually moved from the use position against the body to a suitably displaced position therefrom.

In still another embodiment of the present invention, a lens cover apparatus comprises a mounting structure and a plurality of spring-biased multi-axis articulating lens cover assemblies. The mounting structure is configured for securing the lens cover apparatus to a support structure. Each one of the lens cover assemblies includes a lens cover, a pivot joint structure, and a spring. The pivot joint structure is coupled between the mounting structure and the lens cover and is configured for allowing multi-axis articulation of the lens cover with respect to the mounting structure. The spring is coupled between the pivot joint structure and the lens cover. The spring and the pivot joint structure are jointly configured for causing spring-biased multi-axis articulation of the lens cover between a use position thereof and a stowed position thereof in response to manual initiation of the articulation.

As a skilled person will appreciate from the disclosures made herein, a protective lens cover apparatus in accordance with an embodiment of the present invention exhibits a variety of advantageous aspects with respect to prior art lens cover apparatuses. One such advantageous aspect is the direction in which the spring applies pressure to the lens cover. The spring pulls the lens cover in tight against a body of the sighting device over a lens-receiving opening, which helps prevent inadvertent displacement of the lens cover. Unintentional displacement of the lens cover (i.e., including complete removal in some instances) sometimes occurs with prior art lens covers that use spring pressure to flip them open instead of using spring pressure to hold them closed. A lens cover assembly in accordance with a preferred embodiment of the present invention is configured such that the lens cover is spring-biased (e.g., with a torsion spring), which serves to both hold the lens cover closed when the sighting device is not in use, and also to hold the lens cover in its open/stowed position adjacent am outside surface of the sighting device body when the sighting device is being used. Another such advantageous aspect is that it alleviates incompatibility of hinged lens covers when two scopes (or other sighting devices) are placed very close together (e.g., one in front of the other) on a rail of a firearm. Another such advantageous aspect is that safety and convenience are provided for by one-handed operation associated with spring biasing and self-articulation whereby, for example, a shooter can securely hold a firearm with one hand while manipulating (e.g., opening or closing) the lens cover apparatus with the other hand at all times. Another such advantageous aspect is that safety and convenience are provided for by limiting, if not precluding, noise associated with opening of the lens cover apparatus. Still another such advantageous aspect is that the lens cover apparatus is substantially less obscuring of a user's view when in the open position because it is outside of the line-of-vision through the sighting device once the lens cover has been moved to its open and fully stowed position (i.e., adjacent an outside face of the sighting device so that both eyes may be used in the target acquisition process). Yet another such advantageous aspect is that movement from the use position to the stowed position requires only a deliberate, but short displacement from the use position (i.e., flicking with one finger) to initiate the spring biasing moving the lens cover to the stowed position.

These and other objects, embodiments, advantages and/or distinctions of the present invention will become readily apparent upon further review of the following specification, associated drawings and appended claims.

DETAILED DESCRIPTION OF THE DRAWING FIGURES

A lens cover apparatus in accordance with an embodiment of the present invention solves problems associated with the prior art by providing a lens cover which is firmly attached to a sighting device, and therefore eliminates the need for stowing the lens cover elsewhere when the sighting device is in use. Such a lens cover apparatus allows the lens cover to be moved from a use position to a stowed position, even through a narrow gap between two adjacently mounted sighting devices, by moving it (e.g., swinging it) away from the line of sight on a pivot that is parallel with the line of sight. This movement is accomplished by jointly pivoting about a first pivot axis and a second pivot axis.

With respect to the disclosures made herein, the first pivot axis when used in the context of a gun scope or sighting device, is defined as an axis running substantially parallel to or slightly skewed with respect to a line of sight of a gun's scope or sighting device and/or with respect to a barrel bore of the gun in the case of a gun scope. For devices that resemble a right cylinder or right circular cylinder, the first pivot axis is parallel with the sides of the cylinder and perpendicular to the base of the cylinder. A lens cover of a lens cover apparatus in accordance with the present invention can be structured such that it pivots around the first pivot axis so that the lens cover may be swung back and forth between a covering position over the lens and a non-covering or sighting-device-in-use position in such a way that it can pass through a very narrow gap between two adjacently mounted (i.e., end-to-end) sighting devices. The second pivot axis is defined as being substantially or approximately perpendicular to the first pivot axis. While the axes can be perpendicular, it is also disclosed that they can be skewed without being perpendicular in order to fit a sighting device that is not smooth or uniform in shape. Furthermore, a sighting device such as for example a scope with a slanted shade cover on the leading end (e.g., a Trijicon model ACOG) can require the first pivot axis to be approximately perpendicular to the plane formed by the leading edge of the shade cover as opposed to being substantially parallel to a centerline axis of the sighting device.

Referring now to FIGS. 1-7, various aspects of a protective lens cover apparatus 100 configured in accordance with a first embodiment of the present invention are shown. The protective lens cover apparatus 100 includes an elongated leg mounting structure 102, a protective lens cover 104, a pivot joint structure 106, and a spring 108 (shown in FIG. 7). The protective lens cover apparatus 100 is specifically configured for use with a firearm scope 109 such as, for example, a Trijicon model ACOG scope, which has a slanted shade cover 110 on the leading end of its body 112.

Figure 6:
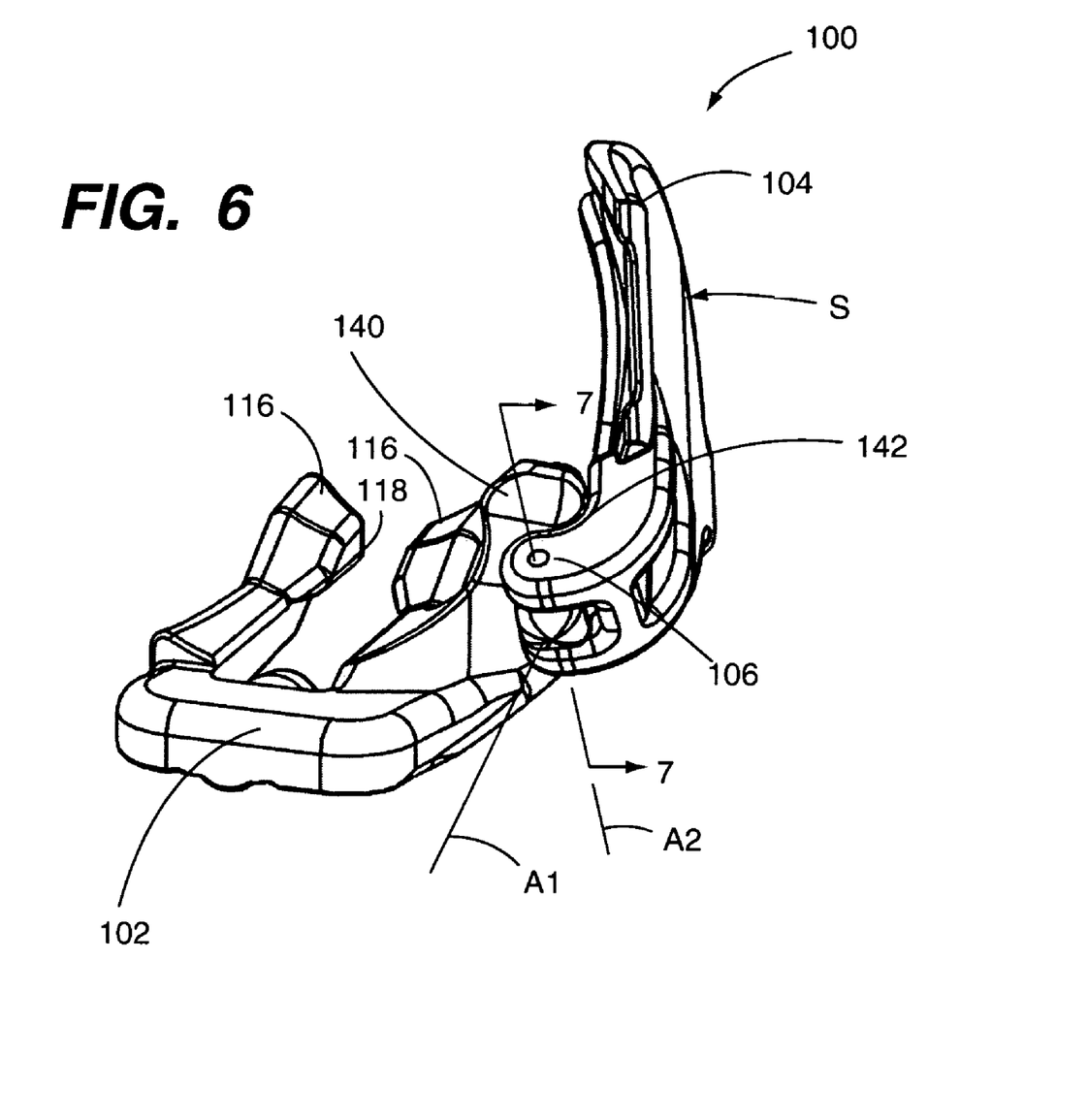

The mounting structure 102 is configured for securing the protective lens cover apparatus 100 to a mating structural component 114 (i.e., support structure) of the scope 109 and/or structure on which the scope 109 is mounted. A skilled person will appreciate that the mounting structure 102 can have any number of different configurations, which are each at least partially dependent on a mating support structure to which a particular configuration of mounting structure engages. As best shown in FIG. 6, the mounting structure 102 includes spaced apart arms 116 that engage opposing sides of the mating structural component 114. As shown in FIG. 6, the arms 116 can be configured to be resiliently flexible for causing a compressive clamping force to be exerted on the mating structural component 114 and/or with protruding portions 118 that engage corresponding features of the mating structural component 114. Regardless of the specific configuration, the mounting structure 102 serves the purpose of securely attaching the protective lens cover apparatus 100 to a support structure of a sighting device in an optionally releasable manner.

The lens cover 104 is configured for covering a lens aperture 120 extending through an external surface of the sighting device body 112. As shown, the lens aperture 120 extends through the sighting device shade cover 110. Preferably, but not necessarily, the lens cover 104 covers an entire portion of the lens aperture 120.

Figure 7:
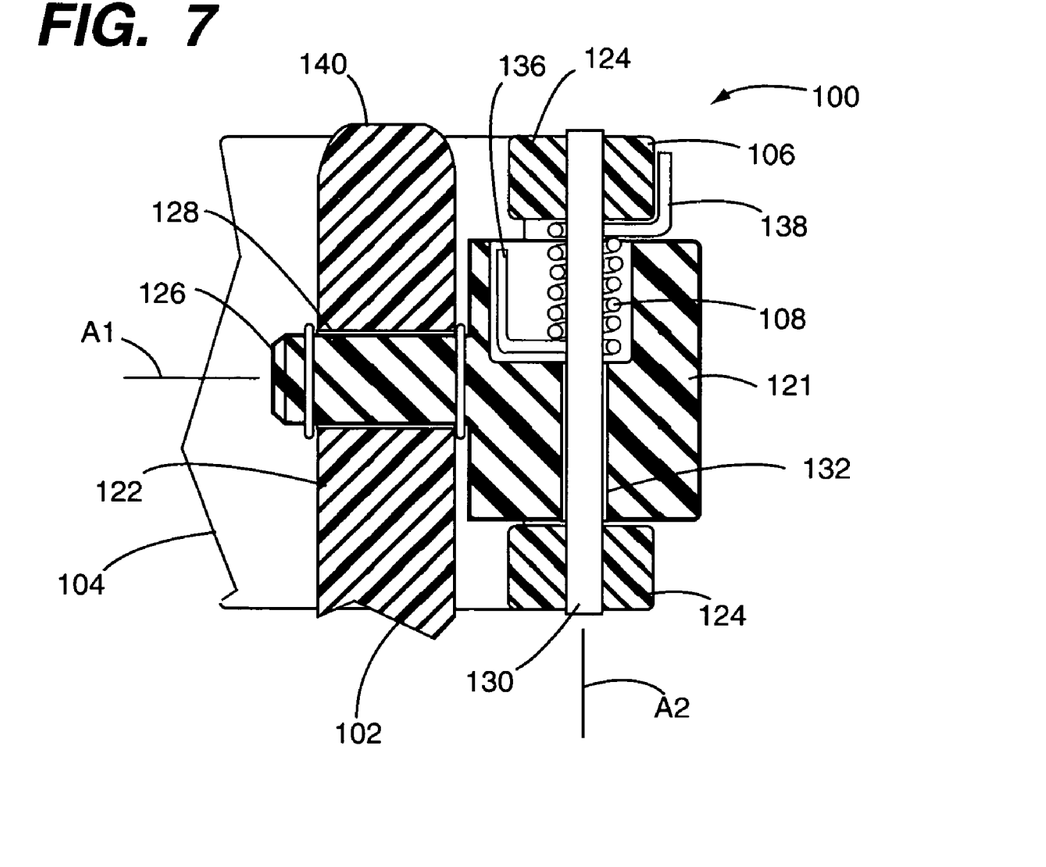

The pivot joint structure 106 is coupled between the mounting structure 102 and the protective lens cover 104. Furthermore, the pivot joint structure 106 is configured for allowing multi-axis articulation of the protective lens cover 104 with respect to the mounting structure 102. As shown in FIG. 7, the pivot joint structure 106 includes a pivot member 121 pivotably connected between a mounting boss 122 of the mounting structure 102 and spaced apart arms 124 of the protective lens cover 104. The pivot member 121 is pivotably engaged with the mounting boss 122 for allowing the pivot member 121, and thus the protective lens cover 104, to pivot about a first pivot axis A1 with respect to the mounting boss 122. As shown, a first pivot pin 126 extends through a mating passage 128 in the mounting boss 122, thereby allowing such pivoting of the pivot member 121 and protective lens cover 104 about the first pivot axis A1 with respect to the mounting boss 122. The spaced apart arms 124 of the protective lens cover 104 are pivotably engaged with the pivot member 121 for allowing the protective lens cover 104 to pivot about a second pivot axis A2 with respect to the pivot member 121. As shown, a pivot pin 130 extends through a mating passage 132 in the mounting boss 122, thereby allowing such pivoting of the pivot member 121 and protective lens cover 104 about the second pivot axis A2 with respect to the pivot member 121. Thus, the pivoting interconnection of the pivot member 121 with the protective lens cover 104 and the mounting boss 122 allows the protective lens cover to be simultaneously and independently pivoted about the first pivot axis A1 and the second pivot axis A2.

The spring 108, which as shown is a torsion spring, is coupled between the pivot member 121 and the protective lens cover 104 in a manner providing a spring bias force on the protective lens cover 104. The spring 108 resides within a cavity 134 within the pivot member 121. The second pivot pin 130 extends through the spring 108. A first leg 136 of the spring 108 is constrained against a surface of the pivot member 121, thereby preventing unrestricted relatively movement thereof with respect to the pivot member 121. A second leg 138 of the spring 108 is constrained against a surface of the protective lens cover 104, thereby preventing unrestricted relative movement thereof with respect to the protective lens cover 104. In view of the configuration of the spring 108 with respect to the lens cover 104 and the pivot member 121, the spring 108 exerts a force (i.e., static biasing force) on the protective lens cover for biasing the protective lens cover 104 to a stowed position S (FIG. 6). Pivoting of the protective lens cover 104 from the stowed position S about the second pivot axis A2 causes additional force biasing the protective lens cover 104 toward the stowed position S to be exerted on the protective lens cover 104. It is disclosed herein a spring such as a leaf spring, compression spring or the like can be used in place of the torsion spring with required adaptation to the pivot member 121 and/or protective lens cover 104, where required.

Figure 5:
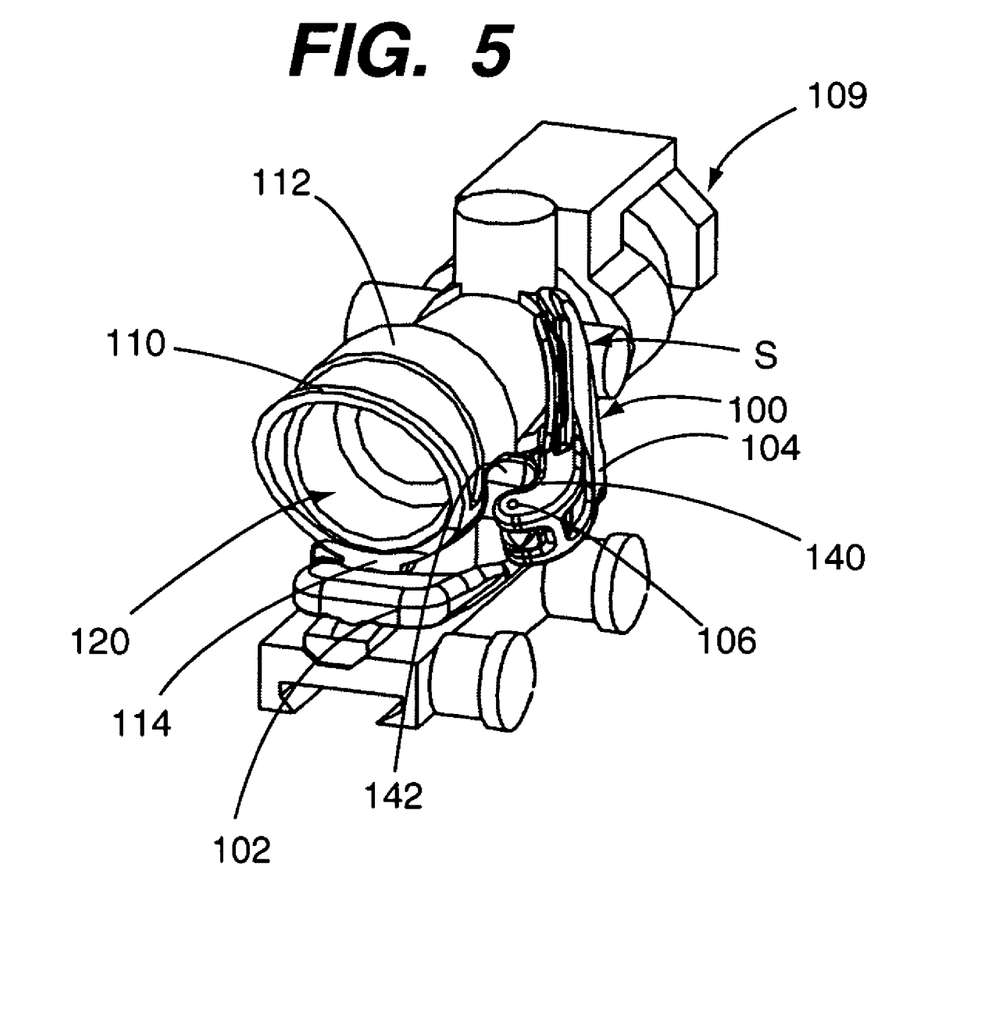

Referring to FIGS. 1-5, the protective lens cover is movable between a use position U (FIG. 1) and the stowed position S (FIG. 5). In the use position U, the protective lens cover 104 is displaced from the stowed position S such that there is a first level of biasing force exerted by the spring 108 on the protective lend cover 104. Thus, after the protective lens cover 104 is manually positioned against the body 112 of the sighting device 109 over the lens aperture 120 thereof, this spring biasing force holds the protective lens cover 104 against the body 112 over the lens aperture 120 thereof.

Figure 1:
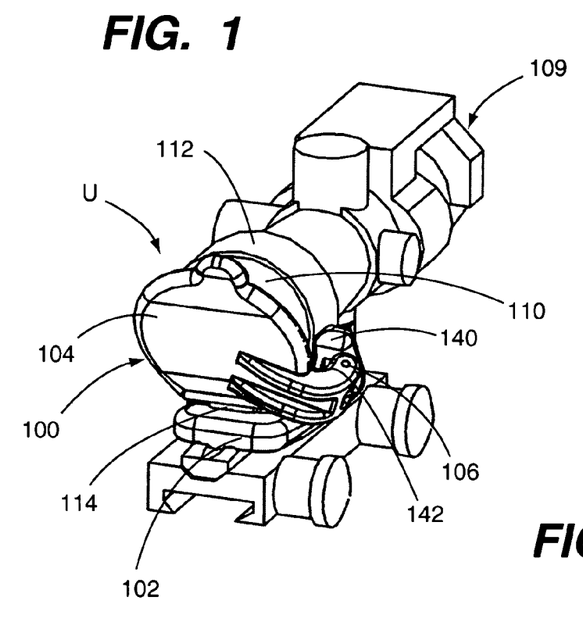
FIGS. 1-7 show various aspects of a protective lens cover apparatus configured in accordance with an embodiment of the present invention, which is specifically configured for use with a sighting device having a slanted shade cover on a leading end of its body.
Figure 2:
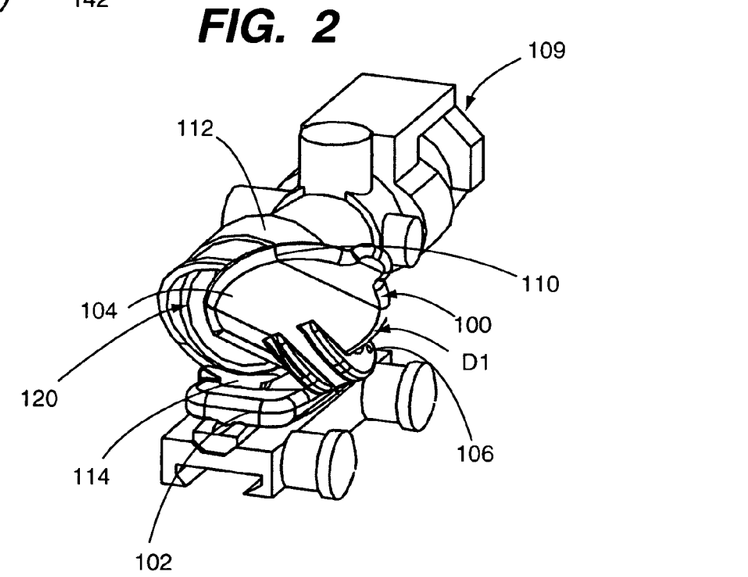
Figures 3, 4:
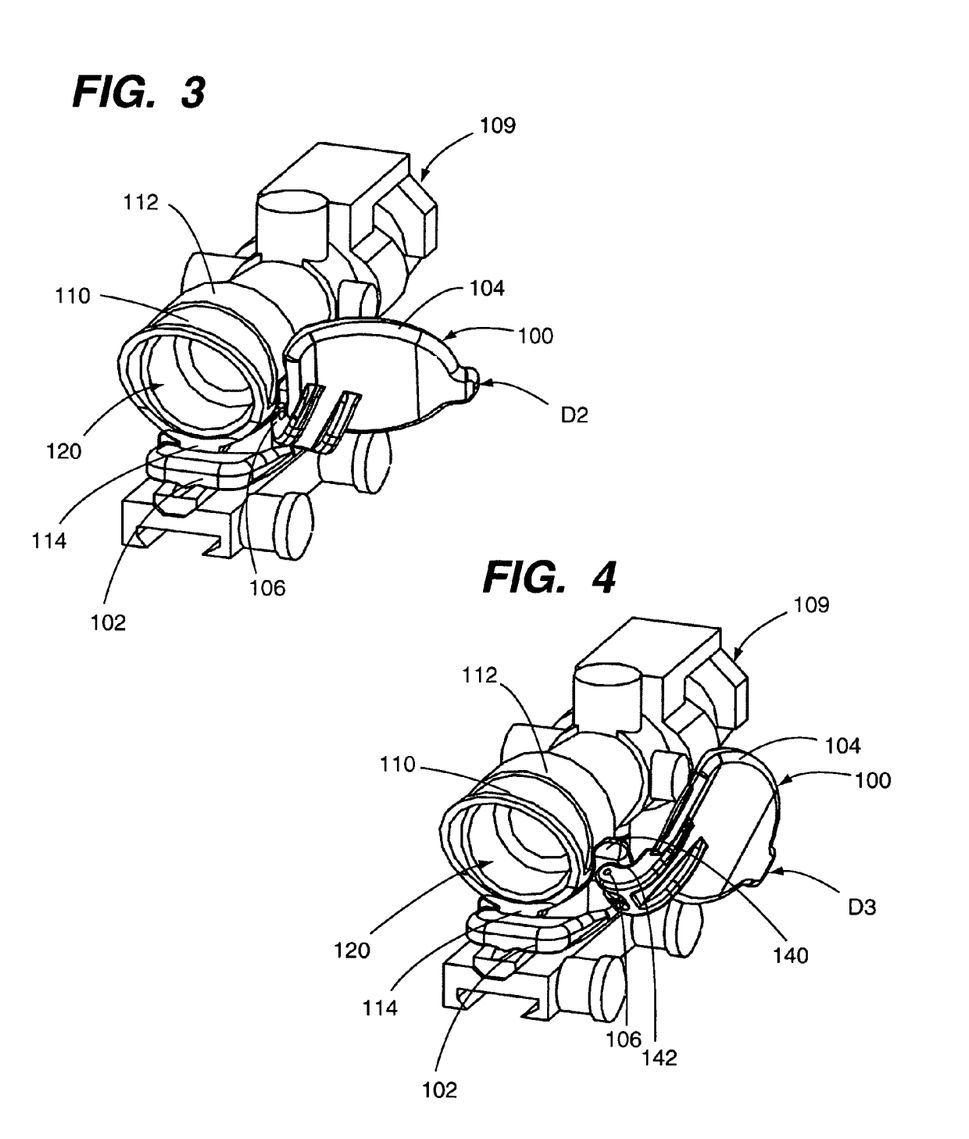

As will be understood in view of the disclosures in reference-to FIGS. 1-7, the spring 108 and the pivot joint structure 106 are jointly configured for causing spring-biased multi-axis articulation of the protective lens cover 104 between the use position U and the stowed position S. In response to manual initiation of such articulation when the protective lens cover 104 is in the use position U (i.e., suitable manual displacement toward the stowed position S), the spring bias force causes the protective lens cover 104 to move to the stowed position S without further manual manipulation. Such movement to the stowed position S involves multi-axis movement of the protective lens cover 104 with respect to the mounting structure 102 (i.e., movement about the first and second pivot axes). As shown in FIGS. 1-5, such multi-axis articulation includes movement along a continuous pathway from the use position U (FIG. 1) to the stowed position S. Displaced position D1 shown in FIG. 2, displaced position D2 shown in FIG. 3, and displaced position D3 in FIG. 4 are examples of intermediate positions between the use position U and the stowed position S. Preferably, the spring 108 is sufficient for moving the protective lens cover 104 from at least the first displaced position D1 to the stowed position S.

The protective lens cover apparatus 100 can include an articulation control structure integral with protective lens cover 104 and/or the mounting structure 102. Such an articulation control structure is configured for causing the protective lens cover 104 to approximately or specifically follow a prescribed path of movement with respect to the mounting structure 102 during at least a portion of movement from the use position U to the stowed position S. In at least one embodiment, a prescribed path of movement includes at least a portion of the lens cover positions shown in FIGS. 1-5.

As shown in FIGS, 1-7, one embodiment of the articulation control structure includes a tip portion 140 of the mounting boss 122 having a contoured profile (e.g., being rounded) and each one of the spaced apart legs 124 of the protective lens cover 104 having a mating contoured portion surface 142. During movement of the protective lens cover 104 from the use position U to the stowed position S, engagement of the tip portion 140 of the mounting boss 122 with the mating contoured portion surface 142 of the spaced apart legs 124 causes the protective lens cover 104 to follow the prescribed path of movement, whereby the spring bias force moves the protective lens cover at partially along such path.

Figure 8:
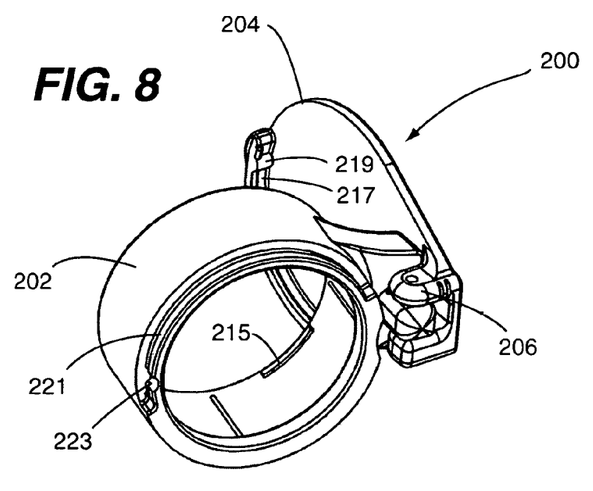
FIGS. 8-9 show various aspects of a protective lens cover apparatus configured in accordance with an embodiment of the present invention, which is specifically configured for use with a sighting device having a non-slanted shade cover on a leading end of its body.
Figure 9:
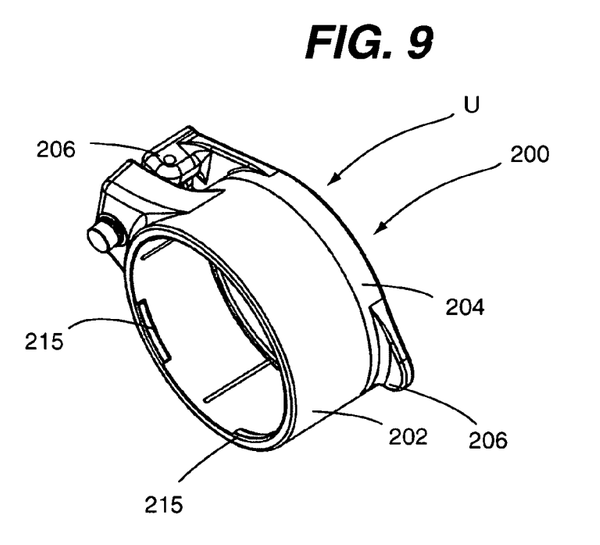

Referring now to FIGS. 8 and 9, various aspects of a protective lens cover apparatus 200 configured in accordance with a second embodiment of the present invention are shown. The protective lens cover apparatus 100 includes a bezel ring mounting structure 202, a protective lens cover 204, a pivot joint structure 206, and a spring (not specifically shown). The overall interconnection, interoperability, pivotability, articulation, and the like of the protective lens cover 204, the pivot joint structure 206, and the spring are effectively the same as that of the protective lens cover apparatus I 00 disclosed in reference to FIGS. 1-7. Thus, such interconnection and interoperability of the protective lens cover 204, the pivot joint structure 206, and the spring of the protective lens cover 200 in FIGS. 8 and 9 will not be discussed further.

One key distinction of the protective lens cover apparatus 200 with respect to the protective lens cover apparatus 100 of FIGS. 1-7 is that the protective lens cover apparatus 200 is specifically configured for use with sighting devices having a non-slanted shade cover on a leading and/or end of its body. To this end, the bezel ring mounting structure 202 is configured for mounting over a leading and/or trailing end of the body of the sighting device. More specifically, the bezel ring mounting structure 202 snaps onto the leading end or trailing of the body of the sighting device via one or more retention members 215 that engage respective features of the body of the sighting device.

Another key distinction of the protective lens cover apparatus 200 with respect to the protective lens cover apparatus 100 of FIGS. 1-7 is that the protective lens cover 204 includes an alignment feature 217 and a retention feature 219 that engage a mating alignment feature 221 and a mating retention feature 223, respectively, of the bezel ring mounting structure 202. Engagement of the alignment feature 217 with the mating alignment feature 221 provides for positive positioning of the protective lens cover 204 (i.e., in a use position U, FIG. 9)

with respect to the bezel ring mounting structure 202, and engagement of the retention feature 219 with the mating retention feature 223 provides for positive retention of the protective lens cover 204 with respect to the bezel ring mounting structure 202 once the protective lens cover 204 is properly positioned with respect to the bezel ring mounting structure 202 in the use position. In one embodiment, the alignment feature 217 is a protruding ridge and the mating alignment feature 221 is a mating slot, and the retention feature 219 is a protruding structure and the mating retention feature 223 is a detent.

Figure 10:
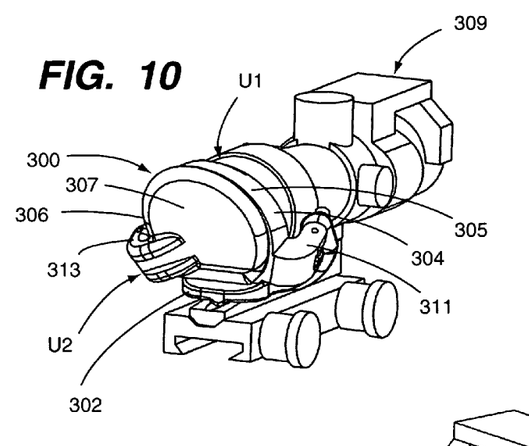
FIGS. 10-12 show various aspects of a multi-function lens cover apparatus configured in accordance with an embodiment of the present invention, which is specifically configured with a first lens- cover assembly configured for limiting an angle of transmission of light transmitted therethrough and a second lens cover assembly configured for covering (e.g., protecting) a lens and/or the first lens cover.
Figure 11:
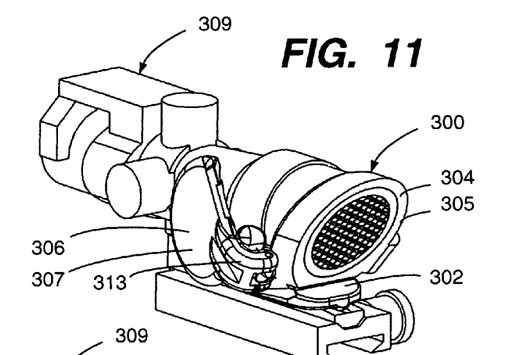
Figure 12:
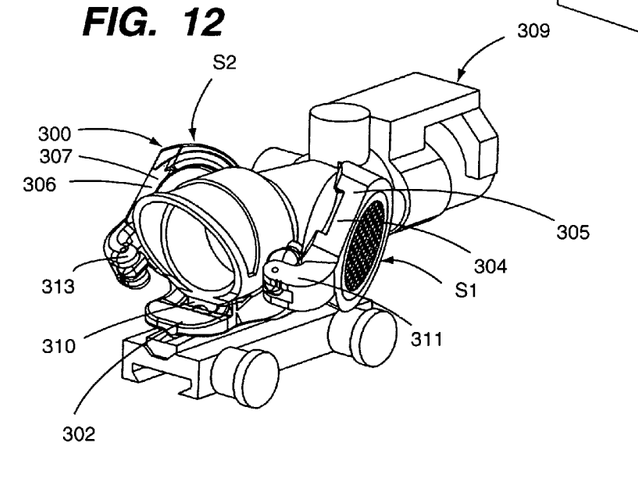

FIGS. 10-12 show various aspects of a multi-function lens cover apparatus 300 configured in accordance with an embodiment of the present invention. The lens cover apparatus 300 includes mounting structure 302, a first lens cover assembly 304, and a second lens cover assembly 306. A lens cover 305 of the first lens cover assembly 304 is configured for limiting an angle of transmission of light transmitted therethrough to prevent light from reflecting from an associated lens and causing a detectable (e.g., visible) flash of light. A lens cover 307 of the second lens cover assembly 306 is configured for protecting a lens and/or the first lens cover 304. In one alternate embodiment, the lens cover 305 of the first lens cover assembly is optionally configured for filtering light transmitted therethrough. In another alternate embodiment, the lens cover 307 of the second lens cover assembly is optionally configured for filtering light transmitted therethrough. In still another alternate embodiment, the lens cover 305 of the first lens cover assembly 304 is optionally configured for filtering light transmitted therethrough and the lens cover 307 of the second lens cover assembly is optionally configured for limiting an angle of transmission of light transmitted therethrough to prevent light from reflecting from an associated lens and causing a detectable flash of light.

The lens cover apparatus 300 is configured for use with a sighting device 309 (i.e., a sighting device). The mounting structure 302 of the lens cover apparatus 300 is fixedly engaged with a support structure 310 of the scope 309 (shown in FIG. 12). With respect to their attachment to the mounting structure 302, the first and second lens cover assemblies (304, 306) are each spring-biased multi-axis articulating lens cover as disclosed above with respect to the lens cover apparatuses of FIGS. 1-9. Thus, from spring biasing and multi-axis articulation standpoints, the first and second lens cover assemblies (304, 306) are configured and operable in generally the same manner as the lens cover assemblies disclosed above in reference to FIGS. 1-9.

As shown in FIG. 10, the lens cover 305 of the first lens cover assembly 304 fully or partially overlaps the lens cover 307 of the second lens cover assembly 306 when the first and second lens covers (305, 307) are in their respective use positions (U1, U2). As shown in FIG. 12, the first and second lens covers (305, 307) are positioned on opposing sides of the mounting structure 302 when the first and second lens covers (305, 307) are in their respective stowed positions (S1, S2). Such use positioning and stowed positioning are accomplished through independent multi-axis articulation of the lens cover assemblies (304, 306) and by relative placement of the pivot joint structures (311, 313) of the lens cover assemblies (304, 306). The pivot joint structures (311, 313) of the lens cover assemblies (304, 306) provide for multi-axis articulation as described above in reference to FIGS. 1-5. Although not specifically shown, the first and the second lens cover assemblies (304, 306) each include a respective spring (e.g., torsion spring coupled between the respective lens cover and respective pivot joint structure) for facilitating spring biased positioning and movement of the respective lens cap with respect to the respective pivot joint structure.

Turning now to discussion of specific aspects of lens cover apparatuses in accordance with embodiments of the present invention, in some embodiments, such as on a rifle scope with a slanted shade cover (Trijicon ACOG scope) that is shaped similar to a truncated cylinder or oblique cylinder (geometric definition), it will be preferred to have the lens cover swing on an axis which is substantially non-parallel to the first pivot axis. Instead, the lens cover in this configuration will swing on an axis, which is somewhat perpendicular to the plane formed by the leading edge of the shade hood (or otherwise referred to as the truncated base of the cylinder). For example, the axis of the pivot for the Trijicon ACOG lens cover will be offset about 70 degrees from the plane of the slanted front of the scope in order to allow the lens cover to tuck in against the scope when the lens cover is open, which serves to best protect the lens cover from snagging or being damaged. This same concept could be applied to any scope or other type of sighting device.

Another aspect of some lens cover apparatuses in accordance with some embodiments of the present invention is that they can be spring-loaded so as to both push the lens cover against the end of the sighting device in the closed position, as well as to push the lens cover into an open position (i.e., stowed position) which is relatively flat or tucked in against the outer wall of the sighting device. Keeping the lens cover in such a tucked-in open position, means that it is visually out of the way of the user and is less prone to being snagged and damaged when it is in the open position. This dual spring biasing function is accomplished with only one spring because the use of two axes of movement allows the lens cover to be pivoted in a manner so that the same spring forces the lens cover to its closed position as well as its open position.

The mounting structure of a lens cover apparatus in accordance with some embodiments of the present invention, which secures the lens cover apparatus to the sighting device, can be configured in any of a number of different ways. It can be screwed into threads surrounding a viewing lens. It can be a slide-on ring style bezel, which surrounds the body of the sighting device (such as those used with currently available flip-open lens covers). It can be clipped on or semi-permanently/permanently affixed by screwing, clamping, gluing, taping, banding, or otherwise attaching it to some structural part of the sighting device. It can also be attached by a mounting system to a mounting/support structure associated with the sighting device, such as by attaching directly to a weapon, or attaching it between the weapon and the sighting device mounted on the weapon. Alternatively, the manufacturer of the sighting device may install a boss on or near the leading or trailing edge of the sighting device, which would serve to engage a pivot joint structure of the lens cover apparatus. Generally, the lens cover mounting structure can be configured for being attached in a suitable orientation for allowing the lens cover to operate freely and properly.

One embodiment of a mounting structure for use on a Trijicon ACOG scope or similarly styled scope encompass the use of a mounting member which passes in a rearward fashion through a tunnel which runs along a bottom-of the scope and parallel to the gun barrel. Such a mounting structure can be secured by a finger-compressible latch at the rear end of the tunnel, or by securing an end piece (such as by use of a screw or clamp) at one end of the tunnel. Alternatively, on a sighting device such as a Trijicon ACOG scope, which does not permit ready attachment of a mounting structure thereto, the lens cover apparatus can be attached to the sighting device and/or gun by a spring-type clamp or compression-type clamp that engages an external protrusion on the sighting device.

On some sighting devices, it will be desirable to mount a lens cover apparatus in accordance with the present invention using a bezel type of mounting system that slides over an external surface of a tubular body of the sighting device. However, in some instances, there may not be enough length of the tubular body to provide for reliable mounting. In such cases, a narrow bezel may be used in combination with one or more resilient members (e.g., hook-end springs), which extend between the bezel and a structural portion of the sighting device, thus holding the bezel securely in place.

Some embodiments of the present invention can be constructed with one or more "stops" to limit the hinge or pivot movement from moving past a desired point of movement. Such a structural arrangement will aid the user by allowing movement in each axis only in the correct direction and only to a desired point, so that the lens cover can more easily stow itself in an intended position/location.

Some embodiments of the present invention can include a slight bevel or contour on the interior edge (underside) of the lens cover and a slight matching bevel on the rim (bezel) such that the lens cover and the bezel matingly engage each other. Such contouring of the underside of the lens cover helps the lens cover automatically find its proper seated position and promotes the provision of as tight a seal as possible to keep the lens free of debris and water, as well as to protect from revealing the user's position while maintaining a state of secrecy when engaging an assailant. Furthermore, such embodiments can also have male and female detent nubs set at various points around the rim where the lens cover sits into the rim, thus having the nubs sit into recesses (i.e., divots) that promote intended positioning of the lens cover with respect to the bezel.

In some embodiments of the present invention, a lens cover apparatus is configured for allowing stacking of multiple filters, anti-reflection devices, and/or optical devices in addition to the lens cover. This can be accomplished by utilizing a sliding shaft or elongating apparatus aligned with the first pivot axis such that the lens cover or filters can be slid along the first pivot axis away from the scope and thus disengaged from the scope prior to rotating it around the first pivot axis to an out of the way "open" position. A compression spring or wave washer(s) may be used to spring-load the sliding shaft in a longitudinal manner, which runs parallel to the first pivot axis. The function of such a spring is to allow the lens cover or filter to be moved slightly backward or forward along the first pivot axis such that the lens cover can be provided with a lip which engages into the bezel or outer ring of the sighting device (e.g., as described in the previous paragraph) so that the lens cover can still be moved out of such engagement position and then rotated around the first pivot axis to an out of the way (i.e., stowed) position. In order to allow for the stowing feature to work concurrently with multiple filters and/or the lens cover, the numerous pivot points for the first pivot axis can be mounted at different clock stations such as, for example, 3 o'clock, 6 o'clock, 9 o'clock, and 12 o'clock.

A specific feature of lens cover apparatus in accordance with some embodiments of the present invention is that their "axis two" hinge point can be configured in such a way that the lens cover lays flat against the sighting device body when the lens cover is open. More specifically, a plane of the lens cover will extend essentially parallel to the first pivot axis when the lens cover is in its stowed position. In some applications, it may be desirable to configure the pivot joint structure (e.g., two pivot pins that establish the first pivot axis and the second pivot axis) such that the lens cover will be more closely positioned against the outside of the sighting device body than would be achieved by having the lens cover swing open only to the point of becoming parallel to the first pivot axis. This configuration would be the functional equivalent of a currently available hinged lens cover being opened on its hinge greater than 270 degrees from its closed position.

Some lens cover apparatuses in accordance with the present invention have rigid, hinged, spring-loaded arms mounted on either side of the closed lens cover such that the closed cover would slide off from its cover position while being guided by both arms in a parallel fashion to each other. The two arms would be attached to the sighting device (e.g., scope) by any of the above-referenced means, which were described for attaching the pivoting axis to the scope.

On a sighting device with an ordinary round face on the end of the lens, with such round face being perpendicular to the axis of view through the device, the lens cover of a lens cover apparatus can be configured with a lip around the circumference of the lens cover such that the lip engages the corresponding bezel and serves to provide both a seal in that area and a latching mechanism through interlocking grooves and ridges on the mating parts as they swing together. This configuration of latching and sealing mechanism requires that the lip must only be present around part, but preferably more than half, of the circumference of the lens cover. The preferred embodiment would be for the lip to be present for an arc of about 200 degrees (+ or – approximately 15 degrees), such arc beginning in close proximity to the first pivot axis pivot point of the lens cover. In some embodiments of such a lens cover apparatus, a different or additional latching mechanism can be used to secure the lens cover in its closed and/or stowed (i.e., open) positions. One such latching mechanism can have a feature integral with the lens cover, which would engage with a mating feature integral with a mounting structure of the lens cover apparatus.

Still, lens cover apparatuses in accordance with other embodiments of the present invention can be configured such that hinge movement and axial pivoting are both accomplished by use of a ball and socket rather than by a pivot joint structure having separate, defined hinge axis. For example, a ball and socket arrangement replaces the multi-axis hinge arrangement shown in the figures.

To reduce the potential for damage in the event of being dropped or struck during use, lens cover apparatuses in accordance with some embodiments of the present invention can have a protruding member that extends beyond a body of the sighting device (e.g., scope) with respect to a height of the boss to which the lens cover is pivotably attached. The purpose of this protrusion is to absorb the force of blows if the lens cover device is inadvertently struck during use, as opposed to the lens cover assembly absorbing such force.

In still other embodiments of lens cover apparatuses in accordance with the present invention, angled filters can be provided in conjunction with or in place of the lens cover to prevent the forward most lens optics of a respective sighting device from providing a reflection that can be seen by a distant entity. For example, such angled filters can be mounted with a downward angle so that any reflection seen would be that of the ground. Similarly, a honeycomb grid that is parallel with the first pivot axis can be utilized on the forward most lens optic in place of a filter that is perpendicular to the first pivot axis, thereby limiting if not preventing the creation of reflections from the shiny glass surfaces on the sighting device.

As a skilled person will appreciate, lens cover apparatuses in accordance with the present invention are useful with many types and configurations of sighting devices. More specifically, a lens cover apparatus in accordance with the present invention is useful with many types of optical, targeting, or sighting devices. Examples of such optical, targeting, or sighting devices include, but are not limited to, night vision scopes, flashlights, tactical lights, filter mounts for optical sights, holographic sighting devices, laser firearm sights, laser pointers, unmagnified optical sighting devices, monocular rifle scopes, magnifying adapters for unmagnified firearm scopes, binoculars, radar or laser speed measuring devices, camera lenses, telescopes, spotting scopes, land surveying devices, optical or laser distance measuring devices, and any other device which has a lens, opening, or viewing window in need of a cover. Furthermore, a lens cover apparatus in accordance with the present invention allows for stacking of multiple covers, filters, and accessory optics.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made, without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A lens cover apparatus, comprising:
a mounting structure configured for securing the lens cover apparatus to a support structure;
a lens cover;
a pivot joint structure coupled between the mounting structure and the lens cover and configured for allowing multi-axis articulation of the lens cover with respect to the mounting structure, wherein the pivot joint structure allows the lens cover to independently pivot about a first pivot axis and a second pivot axis and wherein the first pivot axis is non-parallel with respect to the second pivot axis;
a spring coupled between the pivot joint structure and the lens cover, wherein the spring exerts a torsional force on the lens cover about the first pivot axis of the pivot joint structure; and
an articulation control structure integral with at least one of the lens cover and the mounting structure, wherein the articulation control structure is configured for causing the lens cover to follow a prescribed path of movement with respect to the mounting structure during at least a portion of movement from a use position thereof to a stowed position thereof, wherein a first portion of the articulation control structure is integral with the lens cover, wherein a second portion of the articulation control structure is integral with the mounting structure;
wherein the spring and the pivot joint structure are jointly configured for causing spring-biased multi-axis articulation of the lens cover between the use position thereof and the stowed position thereof in response to manual initiation of said articulation;
wherein the spring biases the lens cover toward the use position thereof when the pivot joint structure is in a first orientation; and
wherein the spring biases the lens cover toward the stowed position thereof when the pivot joint structure is in a second orientation different than the first orientation.

2. The lens cover apparatus of claim 1 wherein:
the pivot joint structure allows the lens cover to independently pivot about a first pivot axis and a second pivot axis; and
the first pivot axis is non-parallel with respect to the second pivot axis.

3. The lens cover apparatus of claim 2 wherein the spring exerts a torsional force on the lens cover about one of said pivot axes.

4. The lens cover apparatus of claim 3 wherein:
the spring biases the lens cover toward the use position thereof when the pivot joint structure is in a first orientation; and
the spring biases the lens cover toward the stowed position thereof when the pivot joint structure is in a second orientation different than the first orientation.

5. The lens cover apparatus of claim 4 wherein:
the pivot joint structure allows the lens cover to independently pivot about a first pivot axis and a second pivot axis; and
the first pivot axis is non-parallel with respect to the second pivot axis.

6. A protective lens cover apparatus configured for use with a sighting device, comprising:
a mounting structure configured for being fixedly and releaseably attached to at least one of a body of a sighting device and a support structure on which the sighting device is mountable;
a protective lens cover configured for covering at least a portion of a lens aperture extending through an external surface of the body of the sighting device when the protective lens cover is in a use position thereof with respect to the mounting structure;
a pivot joint structure coupled between the mounting structure and the protective lens cover and configured for allowing multi-axis articulation of the protective lens cover with respect to the mounting structure, wherein the pivot joint structure allows the protective lens cover to independently pivot about a first pivot axis and a second pivot axis and wherein the first pivot axis is non-parallel with respect to the second pivot axis;
a spring coupled between the pivot joint structure and the protective lens cover wherein the spring exerts a torsional force on the protective lens cover about the first pivot axis of the pivot joint structure; and
an articulation control structure integral with at least one of the protective lens cover and the mounting structure, wherein the articulation control structure is configured for causing the protective lens cover to follow a prescribed path of movement with respect to the mounting structure during at least a portion of movement from the use position thereof to the stowed position thereof, wherein a first portion of the articulation control structure is integral with the protective lens cover and wherein a second portion of the articulation control structure is integral with the mounting structure;
wherein the spring and the pivot joint structure are jointly configured for causing spring-biased multi-axis articulation of the protective lens cover between the use position thereof and a stowed position thereof in, response to manual initiation of said articulation;

wherein the spring biases the protective lens cover toward the use position thereof when the pivot joint structure is in a first orientation; and wherein the spring biases the protective lens cover toward the stowed position thereof when the pivot joint structure is in a second orientation different than the first orientation.

7. The protective lens cover apparatus of claim 6 wherein:

the pivot joint structure allows the protective lens cover to independently pivot about a first pivot axis and a second pivot axis; and the first pivot axis is non-parallel with respect to the second pivot axis.

8. The protective lens cover apparatus of claim 7 wherein the spring exerts a torsional force on the protective lens cover about one of said pivot axes.

9. The protective lens cover apparatus of claim 8 wherein:

the spring biases the protective lens cover toward the use position thereof when the pivot joint structure is in a first orientation; and the spring biases the protective lens cover toward the stowed position thereof when the pivot joint structure is in a second orientation different than the first orientation.

10. A sighting device assembly, comprising:

a sighting device including a body having a lens aperture extending through an external surface thereof;

a protective lens cover apparatus including a mounting structure, a protective lens cover, a pivot joint structure coupled between the mounting structure and the protective lens cover, an articulation control structure integral with at least one of the protective lens cover and the mounting structure and a spring coupled between the pivot joint structure and the protective lens cover, wherein the mounting structure is attached to at least one of the body and a support structure on which the sighting device is mounted, wherein the pivot joint structure allows multi-axis articulation of the protective lens cover with respect to the mounting structure, wherein the spring exerts a torsional force on the protective lens cover about a pivot axis of the pivot joint structure, wherein the pivot joint structure allows the protective lens cover to independently pivot about a first pivot axis and a second pivot axis, wherein the first pivot axis is non-parallel with respect to the second pivot axis, wherein the pivot joint structure allows for manual positioning of the protective lens cover in front of the lens aperture such that the spring biases the lens cover into a use position against the body in front of the lens aperture, wherein the pivot joint structure and the spring are jointly configured for causing spring-biased multi-axis articulation of the protective lens cover to a stowed position when the lens cover is manually moved from the use position against the body to a suitably displaced position therefrom, wherein the spring biases the protective lens cover toward the use position thereof when the pivot joint structure is in a first orientation, wherein the spring biases the protective lens cover toward the stowed position thereof when the pivot joint structure is in a second orientation different than the first orientation, wherein the articulation control structure is configured for causing the protective lens cover to follow a prescribed path of movement with respect to the mounting structure during at least a portion of movement from the use position to the stowed position, wherein a first portion of the articulation control structure is integral with the protective lens cover and wherein a second portion of the articulation control structure is integral with the mounting structure.

11. The sighting device assembly of claim 10 wherein, when the protective lens cover is in the stowed position, the protective lens cover is one of flush with a side portion of said sighting device body and engaged with the side portion of said sighting device body.

12. The sighting device assembly of claim 10 wherein:

the pivot joint structure allows the protective lens cover to independently pivot about a first pivot axis and a second pivot axis; and the first pivot axis is non-parallel with respect to the second pivot axis.

13. The sighting device assembly of claim 12 wherein the spring exerts a torsional force on the protective lens cover about one of said pivot axes.

14. The sighting device assembly of claim 13 wherein:

the spring biases the protective lens cover toward the use position thereof when the pivot joint structure is in a first orientation; and the spring biases the protective lens cover toward the stowed position thereof when the pivot joint structure is in a second orientation different than the first orientation.

15. The sighting device assembly of claim 10 wherein, when the protective lens cover is in the stowed position, the protective lens cover is one of flush with a side portion of said sighting device body and engaged with the side portion of said sighting device body.

16. The sighting device assembly of claim 10 wherein, when the protective lens cover is in the stowed position, the protective lens cover is one of flush with a side portion of said sighting device body and engaged with the side portion of said sighting device body.

17. A lens cover apparatus, comprising:

a mounting structure configured for securing the lens cover apparatus to a support structure;

a plurality of spring-biased multi-axis articulating lens cover assemblies, each one of said lens cover assemblies including:

a lens cover;

a pivot joint structure coupled between the mounting structure and the lens cover and configured for allowing multi-axis articulation of the lens cover with respect to the mounting structure; and a spring coupled between the pivot joint structure and the lens cover, wherein the spring and the pivot joint structure are jointly configured for causing spring-biased multi-axis articulation of the lens cover between a use position thereof and a stowed position thereof in response to manual initiation of said articulation;

wherein each one of said lens cover assemblies further includes:

an articulation control structure integral with at least one of the respective lens cover thereof and the mounting structure, wherein the articulation control structure is configured for causing the respective lens cover to follow a prescribed path of movement with respect to the mounting structure during at least a portion of movement from the respective use position to the respective stowed position.

18. The lens cover apparatus of claim 17 wherein:

a first one of said lens cover assemblies is a first type of lens cover; and a second one of said lens cover assemblies is a second type of lens cover.

19. The lens cover apparatus of claim 18 wherein:
the first type of lens cover is a lens cover permitting the transmission of light therethough for the purpose of limiting an angle of transmission of light transmitted therethrough or filtering light transmitted therethrough; and
the second type of lens cover is a protective lens cover.

20. The lens cover apparatus of claim 18 wherein the lens cover of the first one of said lens cover assemblies at least partially overlaps the lens cover of the second one of said lens cover assemblies when said first and second lens covers are in their respective use positions.

21. The lens cover apparatus of claim 20 wherein:
said first and second lens covers are positioned on opposing sides of the mounting structure when said first and second lens covers are in their respective stowed positions.

22. The lens cover apparatus of claim 17 wherein each one of said lens cover assemblies is independently operable with respect to each other one of said lens cover assemblies.

23. The lens cover apparatus of claim 17 wherein:
the pivot joint structure of each one of said lens cover assemblies allows the respective lens cover to independently pivot about a first pivot axis and a second pivot axis; and
the first pivot axis is non-parallel with respect to the second pivot axis.

24. The lens cover apparatus of claim 23 wherein the spring of each one of said lens cover assemblies exerts a torsional force on the respective lens cover about one of said pivot axes.

25. The lens cover apparatus of claim 24 wherein:
the spring of each one of said lens cover assemblies biases the respective lens cover toward the use position thereof when the respective pivot joint structure is in a respective first orientation thereof ; and
the spring of each one of said lens cover assemblies biases the respective lens cover toward the respective stowed position thereof when the pivot joint structure is in a respective second orientation thereof different than the respective first orientation thereof.

26. The lens cover apparatus of claim 25 wherein:
a first one of said lens cover assemblies is a first type of lens cover; and
a second one of said lens cover assemblies is a second type of lens cover.

27. The lens cover apparatus of claim 26 wherein:
the first type of lens cover is a lens cover permitting the transmission of light therethough for the purpose of limiting an angle of transmission of light transmitted therethrough or filtering light transmitted therethrough; and
the second type of lens cover is a protective lens cover.

28. The lens cover apparatus of claim 27 wherein the lens cover of the first one of said lens cover assemblies at least partially overlaps the lens cover of the second one of said lens cover assemblies when said first and second lens covers are in their respective use positions.

29. The lens cover apparatus of claim 28 wherein:
said first and second lens covers are positioned on opposing sides of the mounting structure when said first and second lens covers are in their respective stowed positions.

\* \* \* \* \*